United States Patent
Chumbalkar et al.

(10) Patent No.: US 10,623,526 B2
(45) Date of Patent: Apr. 14, 2020

(54) DYNAMICALLY CONFIGURING MULTI-MODE HARDWARE COMPONENTS BASED ON WORKLOAD REQUIREMENTS

(71) Applicant: Lenovo Enterprise Solutions (Singapore) Pte. Ltd., Singapore (SG)

(72) Inventors: Nagananda Chumbalkar, Raleigh, NC (US); Sumeet Kochar, Cary, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 542 days.

(21) Appl. No.: 15/283,977

(22) Filed: Oct. 3, 2016

(65) Prior Publication Data
US 2018/0097912 A1 Apr. 5, 2018

(51) Int. Cl.
*H04L 29/08* (2006.01)
*H04L 12/927* (2013.01)
*H04L 29/06* (2006.01)

(52) U.S. Cl.
CPC .......... *H04L 67/34* (2013.01); *H04L 47/803* (2013.01); *H04L 67/10* (2013.01); *H04L 67/42* (2013.01)

(58) Field of Classification Search
CPC ......... H04L 67/10; H04L 67/34; H04L 67/42; H04L 47/70; H04L 47/803
USPC ...................................................... 709/226
See application file for complete search history.

(56) References Cited

U.S. PATENT DOCUMENTS

| | | | | |
|---|---|---|---|---|
| 10,042,673 B1* | 8/2018 | Espy | ...................... | G06F 9/5083 |
| 2011/0197059 A1* | 8/2011 | Klein | ...................... | H04L 9/083 |
| | | | | 713/155 |
| 2011/0280264 A1* | 11/2011 | Yamazoe | ............ | H01S 3/08045 |
| | | | | 372/19 |
| 2013/0124814 A1* | 5/2013 | Carter | ................... | G06F 1/3275 |
| | | | | 711/169 |
| 2013/0138783 A1* | 5/2013 | Mallur | ....................... | G06F 8/65 |
| | | | | 709/221 |
| 2014/0281151 A1* | 9/2014 | Yu | .............................. | G06F 1/30 |
| | | | | 711/103 |
| 2015/0096011 A1* | 4/2015 | Watt | ..................... | H04L 63/0272 |
| | | | | 726/15 |
| 2015/0278017 A1* | 10/2015 | Trezise | .................... | G11C 5/04 |
| | | | | 714/764 |

(Continued)

OTHER PUBLICATIONS

Wildstrom et al. ("Adapting to Workload Changes Through On-The-Fly Reconfiguration", May 31, 2006, 16 pages (Year: 2006).*

(Continued)

*Primary Examiner* — Michael C Lai
(74) *Attorney, Agent, or Firm* — Jeffrey L. Streets

(57) ABSTRACT

A method includes identifying workload performance requirements of a workload, and identifying an endpoint hardware configuration that satisfies the workload performance requirements, wherein the endpoint hardware configuration includes a selected mode of a multi-mode component. The method further includes configuring selected endpoint hardware with the identified endpoint hardware configuration including applying the selected mode to the multi-mode component included in the endpoint hardware, and placing the workload on the selected endpoint hardware having the identified endpoint hardware configuration including the multi-mode component operating in the selected mode.

20 Claims, 3 Drawing Sheets

(56) References Cited

U.S. PATENT DOCUMENTS

| | | | | |
|---|---|---|---|---|
| 2015/0319043 A1* | 11/2015 | Dibirdi | ............... | H04L 41/0806 |
| | | | | 370/254 |
| 2016/0062652 A1* | 3/2016 | Hia | ..................... | G06F 12/0246 |
| | | | | 711/102 |
| 2018/0048559 A1* | 2/2018 | Chou | ....................... | H04L 45/16 |

OTHER PUBLICATIONS

VmWare, "vSphere Dynamic Resource Scheduler & Distributed Power Management", https://www.vmware.com/products/vsphere/features/drs-dpm, Jun. 9, 2016, 5 pages.

Peter Stone et al, "Peter Stone's Selected Publications—Adapting to Wrokload Changes Through On-The-Fly Reconfiguration", 2006, 1 page. (This document only identifies the year of publication (without the month), but the year of publication is suffciently earlier than the effective U.S. filing date and any foreign priority date so that the particular onth of publication is not in issue. See MPEP 609.04(a)).

Jonathan Wildstrom et al, "Adapting to Wrokload Changes Through On-The-Fly Reconfiguration", May 31, 2006, 16 pages.

\* cited by examiner

DYNAMICALLY CONFIGURING MULTI-MODE HARDWARE COMPONENTS BASED ON WORKLOAD REQUIREMENTS

BACKGROUND

Field of the Invention

The present invention relates to methods of provisioning a given workload to a given endpoint, such as a server, that is capable of performing the workload.

Background of the Related Art

In a cloud environment, a client device may initiate a workload on a server somewhere in the cloud. Management software is responsible for determining which server or servers will receive and perform the workload. Such determinations may be based on the capacity of a server's CPU, memory, or data storage. Furthermore, the server may already be running other tasks, such that the determination may focus on the remaining available capacity of each server.

BRIEF SUMMARY

One embodiment of the present invention provides a method comprising identifying workload performance requirements of a workload, and identifying an endpoint hardware configuration that satisfies the workload performance requirements, wherein the endpoint hardware configuration includes a selected mode of a multi-mode component. The method further comprises configuring selected endpoint hardware with the identified endpoint hardware configuration including applying the selected mode to the multi-mode component included in the endpoint hardware, and placing the workload on the selected endpoint hardware having the identified endpoint hardware configuration including the multi-mode component operating in the selected mode.

Another embodiment of the present invention provides a computer program product comprising a non-transitory computer readable storage medium having program instructions embodied therewith, wherein the program instructions are executable by a processor to cause the processor to perform a method. The method comprises identifying workload performance requirements of a workload, and identifying an endpoint hardware configuration that satisfies the workload performance requirements, wherein the endpoint hardware configuration includes a selected mode of a multi-mode component. The method further comprises configuring selected endpoint hardware with the identified endpoint hardware configuration including applying the selected mode to the multi-mode component included in the endpoint hardware, and placing the workload on the selected endpoint hardware having the identified endpoint hardware configuration including the multi-mode component operating in the selected mode.

DETAILED DESCRIPTION

Figure 1:
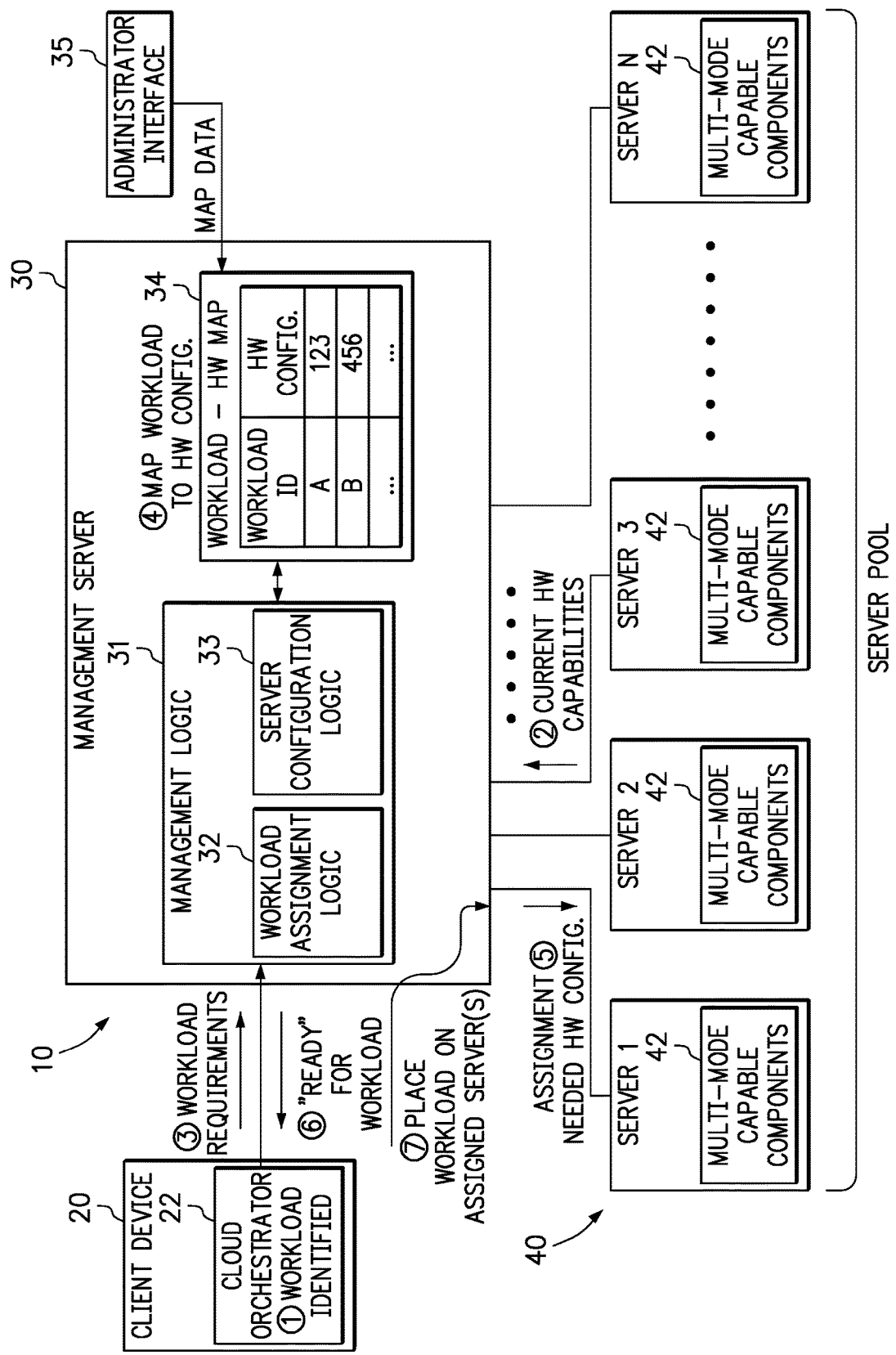
FIG. 1 is a diagram of a system for provisioning a workload from a client device to endpoint hardware including a multi-mode capable component that has been configured to perform the workload.

One embodiment of the present invention provides a method comprising identifying workload performance requirements of a workload, and identifying an endpoint hardware configuration that satisfies the workload performance requirements, wherein the endpoint hardware configuration includes a selected mode of a multi-mode component. The method further comprises configuring selected endpoint hardware with the identified endpoint hardware configuration including applying the selected mode to the multi-mode component included in the endpoint hardware, and placing the workload on the selected endpoint hardware having the identified endpoint hardware configuration including the multi-mode component operating in the selected mode.

Non-limiting examples of the multi-mode component include a Non-Volatile Dual In-line Memory Module (NVDIMM), a PCIe expansion card, a redundant array of independent disks (RAID) controller, and an external group of NVM Express (NVMe) drives. Each multi-mode component may have modes that are specific to the type of components. For example, an NVDIMM may have a two-level memory mode, a block storage mode, and a persistent mode. Similarly, a PCIe card may have a Gen2 and Gen3 mode, and a RAID controller card may have various RAID level modes and a "just a bunch of disks" (JBOD) mode so that the disks can be used for software defined storage (SDS).

The workload performance requirements of a workload may, for example, be affected by a Service Level Agreement (SLA) covering the identified workload. An SLA between a client and a host may specify that the host will perform a workload at a low-latency requirement. In one option, the workload performance requirements are received from the same client device that provides the workload.

In another embodiment, the method identifies an endpoint hardware configuration that satisfies the workload performance requirements by accessing a predetermined association between the workload and the identified endpoint hardware configuration. This association may be established by administrator manually associating each of a group of typical encountered workloads with a suitable endpoint hardware configuration. Such associations may be stored in any workload-hardware data structure, such as a list, database, map or lookup table. For example, the association between a workload and an endpoint hardware configuration may be identified by storing them in a common record among a plurality of records. When a workload that is to be provisioned or migrated has been identified, the record including the workload or the same workload type is located, and the endpoint hardware configuration with the same record is identified.

In a still further embodiment, the method may include monitoring a load on the multi-mode component while performing the workload, and reconfiguring the multi-mode component to operate in a different mode in response to the load exceeding a predetermined threshold load. Accordingly, the method may, over a period of time, learn the optimal mode of each multi-mode component for performing a given workload. The method will then preferably store the optimal mode to the workload-hardware data structure for use when performing subsequent instances of the workload.

In one option, the selected endpoint hardware may include one or more selected servers. For example, a datacenter may include a large number of servers that are available to perform workloads, such that any one or more of the servers may be selected as the endpoint hardware for performing a given workload. Any of the servers may include a multi-mode component or have a multi-mode component directly connected to thereto. Accordingly, the step of placing the workload on the selected endpoint hardware may include provisioning a new workload from a client device to the one or more selected servers or migrating an existing workload from one server to another of the servers. In some implementations, the selected endpoint hardware may include multiple selected servers, wherein each of selected servers includes a multi-mode component, such that the endpoint hardware configuration includes a selected mode for each of the multi-mode components.

In a further embodiment, the method includes discovering hardware capabilities for each of a plurality of servers. For example, the hardware capabilities of each server may be discovered by receiving a message from each server, wherein each message advertises the capabilities of the server. With access to the capabilities of each server, a management entity may select endpoint hardware (i.e., one or more selected servers from among the plurality of servers) that has the capacity and functions to perform the workload. Optionally, the message identifying the hardware capabilities of a server may be received from each of the servers through an out-of-band channel. Such a message may be sent by a service processor of the server. The hardware capabilities may be discovered or obtained in any other manner, such as from a previously compiled list of server hardware capabilities that may be stored on the management server.

A server's hardware capabilities may include, for example, performance specifications for one or more processors, system memory, data storage type and capacity, and other data describing the server. However, in accordance with embodiments of the present invention, the hardware capabilities may further include, without limitation, identifying data regarding each of the multi-mode components of the server. For example, a server may have a PCI adapter capable of one or more speeds (i.e., Gen 1, Gen 2, Gen 3 or Gen 4), NVDIMM capable of various modes (i.e., storage mode, persistent memory mode or regular system memory mode), and/or a network interface controller (NIC) with various capabilities (i.e., single root input/output virtualization (SR-MY) or internet small computer systems interface (iSCSI)).

Another embodiment of the present invention provides a computer program product comprising a non-transitory computer readable storage medium having program instructions embodied therewith, wherein the program instructions are executable by a processor to cause the processor to perform a method. The method comprises identifying workload performance requirements of a workload, and identifying an endpoint hardware configuration that satisfies the workload performance requirements, wherein the endpoint hardware configuration includes a selected mode of a multi-mode component. The method further comprises configuring selected endpoint hardware with the identified endpoint hardware configuration including applying the selected mode to the multi-mode component included in the endpoint hardware, and placing the workload on the selected endpoint hardware having the identified endpoint hardware configuration including the multi-mode component operating in the selected mode.

The foregoing computer program products may further include program instructions for implementing or initiating any one or more aspects of the methods described herein. Accordingly, a separate description of the methods will not be duplicated in the context of a computer program product.

FIG. 1 is a diagram of a system 10 for provisioning a workload from a client device 20 to endpoint hardware including a multi-mode capable component that has been configured to perform the workload. In the embodiment shown, the system 10 includes the client device 20 in communication with a management server 30 that manages the workloads performed by a plurality of servers 40 ("Server Pool"). The client device 20 includes cloud orchestrator software 22 that allows the client device to interface with the management server 30 and submit a workload.

The management server 30 executes management logic 31 to implement embodiments of the present invention. As shown, the management logic 31 may include workload assignment logic 32 and server configuration logic 33. The workload assignment logic 32 may be responsible for assigning a workload to endpoint hardware within the server pool 40. The endpoint hardware assigned to perform the workload may be a single server or multiple servers, including one or more multi-mode components 42. The workload assignment logic 32 may consider any number of factors, such as available server capacity, workload size and performance requirements, as well as load balancing, power management and reliability considerations. Furthermore, the workload assignment logic 32 may have access to data identifying the hardware capabilities of each server in the server pool 40. Such hardware capabilities data may be obtained by each server reporting its own capabilities to the management server 30, either through in-band or out-of-band communications. For example, a service processor on each server may report the server's hardware capabilities through an out-of-band communication channel.

The server configuration logic 33 may be responsible for configuring a hardware endpoint in preparation for assigning a workload to the hardware endpoint. Based on workload performance requirements identified by information received from the client device 20, the server configuration logic 33 may determine an endpoint hardware configuration that is suitable for the workload. Such determination may, for example, include referencing a workload-hardware data structure 34, including predetermined associations between various workloads or workload types and endpoint hardware configurations that are suitable for performing those workloads or workload types. As shown, the workload-hardware data structure 34 may take the form of a lookup table, but any other data structure may also be used. An administrator interface 35 may be used to manually enter or transfer data to form the workload-hardware data structure 34. However, over time, the management logic 31 may update the workload-hardware data structure 34 to reflect changes to the endpoint hardware configuration that have been made in order to perform the workload. Such updates may include changes to the selected mode of one or more of the multi-mode components that are included in the endpoint hardware. Accordingly, subsequent instances of the workload may be assigned to endpoint hardware that uses the updated endpoint hardware configuration with the updated mode for the one or more multi-mode components.

In addition to the system 10, FIG. 1 illustrates various steps of a method according to one embodiment of the present invention. In step (1), the cloud orchestrator 22 on the client device 20 identifies a workload that is to be performed by the server pool 40. In step (2), each server in the server pool 40 reports its current hardware capabilities to the management server 30. In step (3), the client device 20 submits workload performance requirements for the identified workload to the management logic 31 on the management server 30. Using the workload identity (per step (1)) and/or the workload performance requirements (per step (3)), the management logic 31 maps the workload to an endpoint hardware configuration in step (4), preferably using the workload-hardware data structure 34. In step (5), the workload assignment logic 32 of the management server 30 assigns or applies an endpoint hardware configuration to one or more of the selected servers of the server pool 40. In step (6), the management logic 31 then informs the client device 20 that the selected endpoint hardware is ready to receive the workload, preferably also identifying the selected endpoint hardware to the client device 20. Then, in step (7), the workload is placed on the assigned one or more servers of the selected endpoint hardware.

Figure 2:
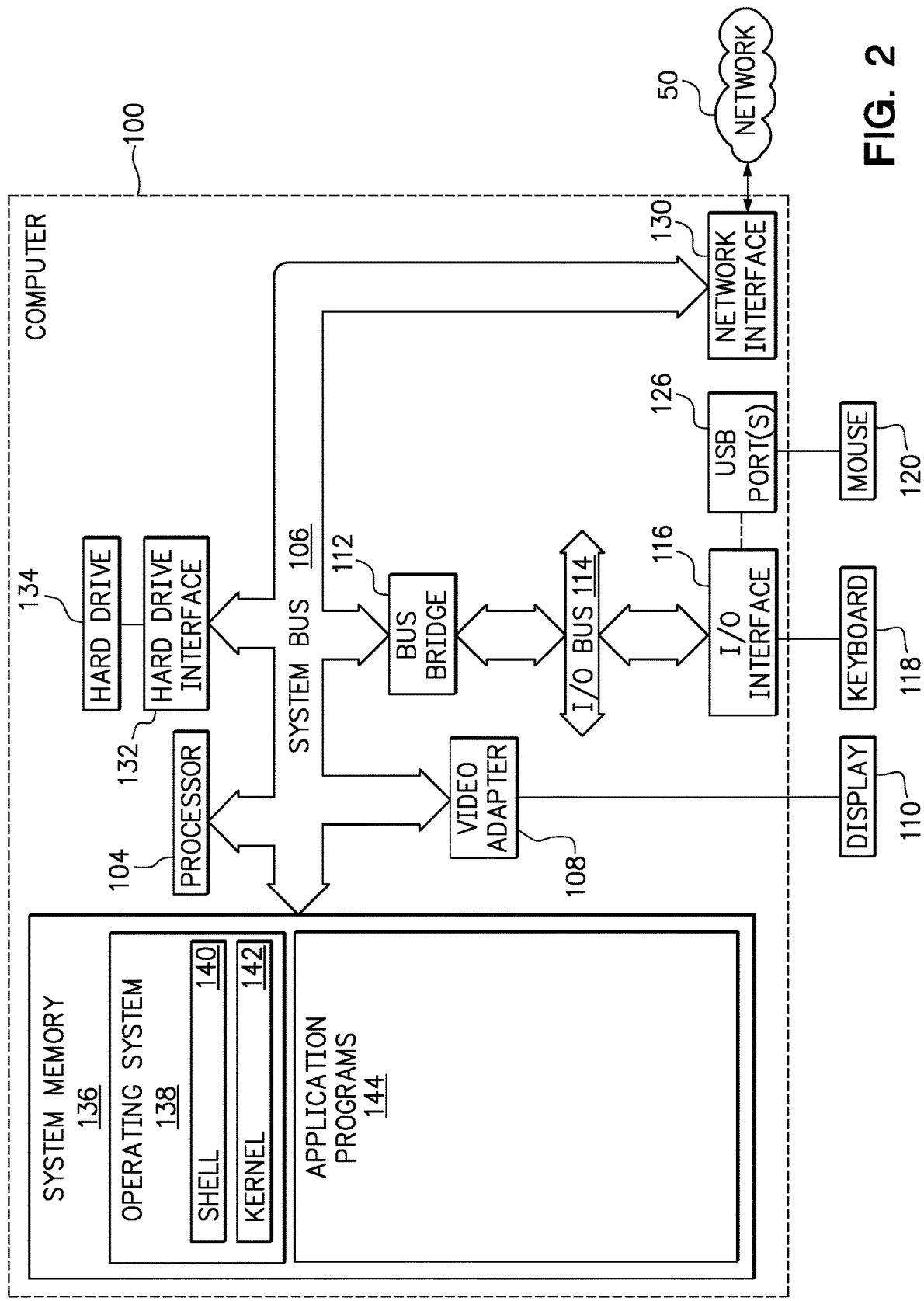
FIG. 2 is a diagram of a generic computer that is representative of the client device, the management server, and the servers in the server pool.

FIG. 2 is a diagram of a generic computer 100 that is representative of either of the client device 20, the management server 30, and the servers in the server pool 40 of FIG. 1, according to one embodiment of the present invention. The computer 100 includes a processor unit 104 that is coupled to a system bus 106. The processor unit 104 may utilize one or more processors, each of which has one or more processor cores. A video adapter 108, which drives/supports a display 110, is also coupled to system bus 106. The system bus 106 is coupled via a bus bridge 112 to an input/output (I/O) bus 114. An I/O interface 116 is coupled to the I/O bus 114. The I/O interface 116 affords communication with various I/O devices, including a keyboard 118, and a USB mouse 124 via USB port(s) 126. As depicted, the computer 100 is able to communicate with other network devices over the network 50 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory includes additional higher levels of volatile memory (not shown), including, but not limited to, cache memory, registers and buffers. Data that populates the system memory 136 includes the operating system (OS) 138 and application programs 144.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 may be a text-based, line-oriented user interface, the present invention may support other user interface modes, such as graphical, voice, gestural, etc.

As depicted, the operating system 138 also includes the kernel 142, which includes lower levels of functionality for the operating system 138, including providing essential services required by other parts of the operating system 138 and application programs 144. Such essential services may include memory management, process and task management, disk management, and mouse and keyboard management. The operating system 138 further includes various configuration parameters 143, such as an Ethernet media access control (MAC) address, a fiber channel world-wide name (WWN), or a storage adapter parameter for providing connectivity to a storage area network (SAN).

As shown, the computer 100 includes application programs 144 in the system memory of the computer 100. While not specifically shown in FIG. 2, the application programs 144 may include the cloud orchestrator 22 in the case that the computer 100 is the client device 20, the management logic 31 in the case that the computer 100 is the management server 30, or the workload being performed in the case that the computer 100 is one of the servers in the server pool 40.

The hardware elements depicted in the computer 100 are not intended to be exhaustive, but rather are representative. For instance, the computer 100 may include alternate memory storage devices such as magnetic cassettes, digital versatile disks (DVDs), Bernoulli cartridges, and the like. These and other variations are intended to be within the scope of the present invention.

Figure 3:
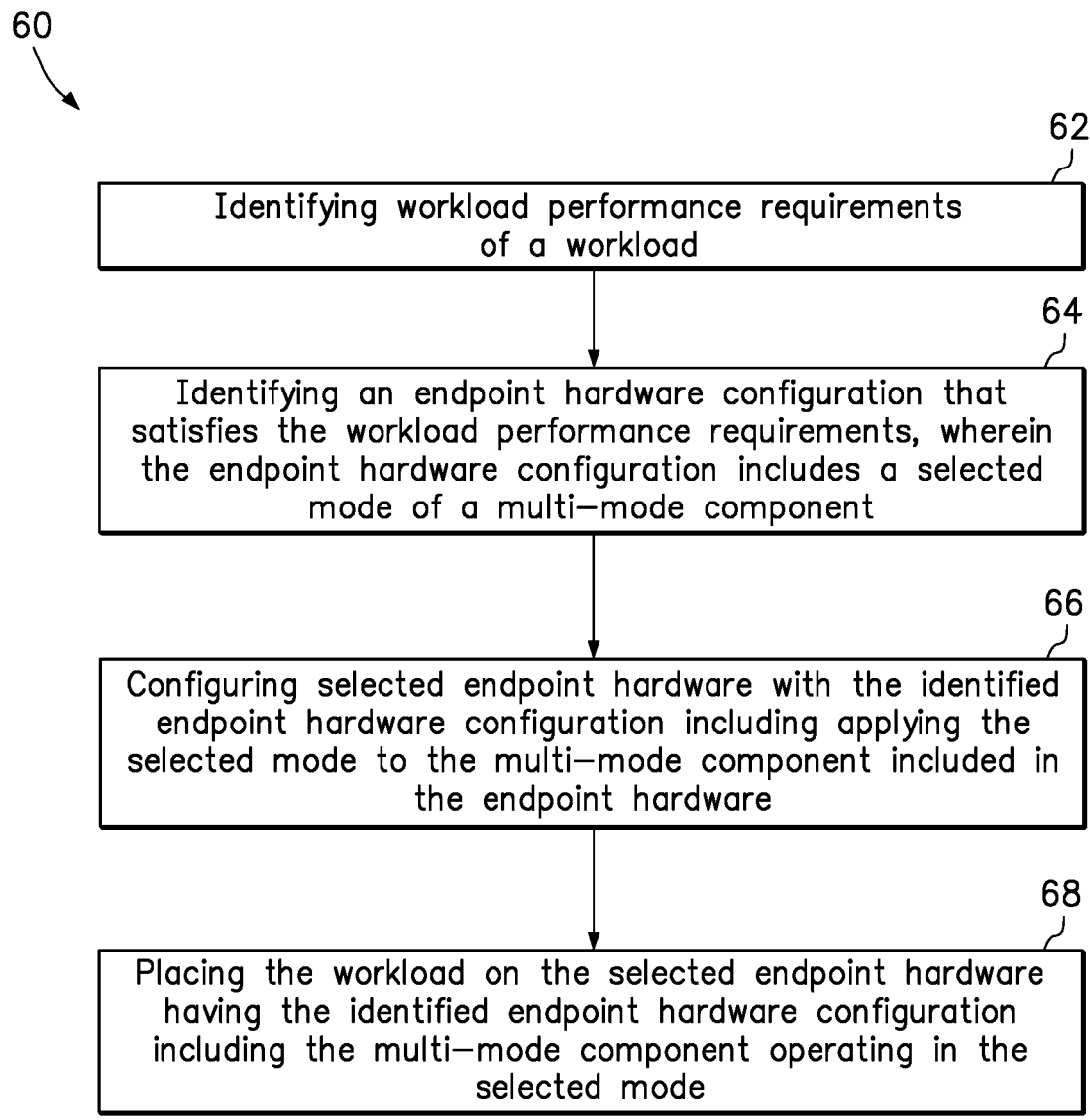
FIG. 3 is a flowchart of a method according to one embodiment of the present invention.

FIG. 3 is a flowchart of a method 60 according to one embodiment of the present invention. In step 62, the method includes identifying workload performance requirements of a workload. In step 64, the method includes identifying an endpoint hardware configuration that satisfies the workload performance requirements, wherein the endpoint hardware configuration includes a selected mode of a multi-mode component. In step 66, the method then configures selected endpoint hardware with the identified endpoint hardware configuration including applying the selected mode to the multi-mode component included in the endpoint hardware. Step 68 then places the workload on the selected endpoint hardware having the identified endpoint hardware configuration including the multi-mode component operating in the selected mode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    identifying workload performance requirements of a workload;
    identifying an endpoint hardware configuration that satisfies the workload performance requirements, wherein the endpoint hardware configuration includes a selected mode;
    configuring selected endpoint hardware to meet the identified endpoint hardware configuration, wherein the selected endpoint hardware includes a multi-mode component, and wherein configuring the selected endpoint hardware includes applying the selected mode to the multi-mode component; and
    placing the workload on the selected endpoint hardware that is configured with the identified endpoint hardware configuration such that the multi-mode component operates in the selected mode.

2. The method of claim 1, wherein the multi-mode component is a Non-Volatile Dual In-line Memory Module (NVDIMM).

3. The method of claim 2, wherein the selected mode is selected from two-level memory mode, block storage mode, or persistent mode.

4. The method of claim 1, wherein the multi-mode component is a PCIe expansion card, and wherein the selected mode specifies a PCIe generation mode.

5. The method of claim 1, wherein the multi-mode component is a redundant array of independent disks (RAID) controller, and wherein the selected mode is selected from a RAID level mode and a just a bunch of disks (JBOD) mode.

6. The method of claim 1, wherein the multi-mode component is an external group of Non-Volatile Memory Express (NVMe) drives.

7. The method of claim 1, wherein identifying workload performance requirements of a workload, includes identifying the workload performance requirements specified in a Service Level Agreement covering the workload.

8. The method of claim 1, wherein the selected endpoint hardware includes multiple selected servers, wherein the multiple selected servers each include a multi-mode component, and wherein the endpoint hardware configuration includes a selected mode for each of the multi-mode components.

9. The method of claim 1, wherein the selected endpoint hardware includes one or more selected servers.

10. The method of claim 9, wherein the multi-mode component is directly connected to one of the one or more selected servers.

11. The method of claim 9, wherein placing the workload on the selected endpoint hardware, includes provisioning the workload from a client device to the one or more selected servers.

12. The method of claim 9, wherein placing the workload on the selected endpoint hardware, includes migrating the workload from a first server to the one or more selected server.

13. The method of claim 1, wherein identifying workload performance requirements of a workload, includes receiving the workload performance requirements from a client device that provides the workload.

14. The method of claim 1, further comprising:
discovering hardware capabilities for each of a plurality of servers.

15. The method of claim 14, wherein discovering hardware capabilities for each of a plurality of servers, includes receiving a message from each of the servers, each message advertising the capabilities of one of the servers, and wherein the selected endpoint hardware includes one or more selected servers from among the plurality of servers.

16. The method of claim 15, wherein the message is received from each of the servers through an out-of-band channel.

17. The method of claim 1, wherein identifying an endpoint hardware configuration that satisfies the workload performance requirements, includes accessing a predetermined association between the workload and the identified endpoint hardware configuration.

18. The method of claim 1, further comprising
monitoring a load on the multi-mode component while performing the workload; and
reconfiguring the multi-mode component to operate in a different mode in response to the load exceeding a predetermined threshold load.

19. The method of claim 18, further comprising:
storing the different mode to a workload-hardware data structure for use when performing subsequent instances of the workload.

20. A computer program product comprising a non-transitory computer readable storage medium having program instructions embodied therewith, the program instructions executable by a processor to cause the processor to perform a method comprising:
identifying workload performance requirements of a workload;
identifying an endpoint hardware configuration that satisfies the workload performance requirements, wherein the endpoint hardware configuration includes a selected mode;
configuring selected endpoint hardware to meet the identified endpoint hardware configuration, wherein the selected endpoint hardware includes a multi-mode component, and wherein configuring the selected endpoint hardware includes applying the selected mode to the multi-mode component; and
placing the workload on the selected endpoint hardware that is configured with the identified endpoint hardware configuration such that the multi-mode component operates in the selected mode.

* * * * *